United States Patent
Kull et al.

(10) Patent No.: US 7,144,161 B2
(45) Date of Patent: Dec. 5, 2006

(54) HYDRODYNAMIC BEARING SYSTEM FOR A ROTARY BEARING OF SPINDLE MOTORS

(75) Inventors: Andreas Kull, Donaueschingen (DE); Tadashi Akahori, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 475 days.

(21) Appl. No.: 10/620,224

(22) Filed: Jul. 15, 2003

(65) Prior Publication Data

US 2004/0028301 A1    Feb. 12, 2004

(30) Foreign Application Priority Data

Jul. 15, 2002   (DE) .................... 202 11 588 U

(51) Int. Cl.
  *F16C 17/02*   (2006.01)
(52) U.S. Cl. ..................................... 384/107
(58) Field of Classification Search .............. 384/107, 384/112, 113, 120
  See application file for complete search history.

(56) References Cited

U.S. PATENT DOCUMENTS

| 3,503,658 A | 3/1970 | Remmers et al. |
| 5,540,504 A * | 7/1996 | Cordova et al. ............ 384/107 |
| 5,541,462 A | 7/1996 | Nii et al. |
| 5,667,309 A | 9/1997 | Nose |
| 5,855,438 A | 1/1999 | Lee |

FOREIGN PATENT DOCUMENTS

| DE | 1 525 198 | 8/1969 |
| DE | 21 21 580 | 12/1971 |
| DE | 32 31 133 A1 | 2/1984 |
| DE | 33 32 357 C1 | 4/1985 |
| DE | 201 09 824 U1 | 6/2001 |
| DE | 696 15 098 T2 | 1/2002 |
| DE | 101 00 470 A1 | 11/2002 |
| EP | 0 844 408 A2 | 5/1998 |

* cited by examiner

*Primary Examiner*—Lenard A. Footland
(74) *Attorney, Agent, or Firm*—Joel E. Lutzker, Esq.; John C. Garces, Esq.; Schulte Roth & Zabel LLP

(57) ABSTRACT

A hydrodynamic bearing system, particularly for the rotary bearing of spindle motors to power hard disk drives. The bearing system includes a bearing sleeve, a shaft accommodated in an opening in the bearing sleeve and at least one radial bearing section provided between the bearing sleeve and the shaft with the aid of which the shaft and the bearing sleeve are supported rotatably in relation to each other. A bearing gap is formed between the shaft and the bearing sleeve and is filled with a liquid lubricant. A lubricant reservoir and equalizing volume independent from the design of the bearing arrangement is provided in that at least one duct is formed in the bearing sleeve that extends from an outer section of the bearing sleeve to the bearing gap and that is at least partially filled with lubricant.

11 Claims, 3 Drawing Sheets

HYDRODYNAMIC BEARING SYSTEM FOR A ROTARY BEARING OF SPINDLE MOTORS

CROSS REFERENCE TO RELATED APPLICATION

This application claims all rights of priority to German Patent Application No. DE 202 11 588.7, filed on Jul. 15, 2002 (pending).

FIELD OF THE INVENTION

The invention relates to a hydrodynamic bearing system, for rotational support of rotors of spindle motors utilized to power hard disk drives.

BACKGROUND OF THE INVENTION

A conventional hydrodynamic bearing system essentially includes a bearing sleeve, a shaft accommodated in a cylindrical bore of the bearing sleeve and at least one radial bearing section provided between the bearing sleeve and the shaft with the aid of which the shaft and the bearing sleeve are supported with respect to each other during operation of the spindle motor. A bearing gap formed between the shaft and the bearing sleeve is filled with a liquid lubricant, preferably bearing oil.

In general, hydrodynamic bearings are being increasingly used as rotary bearings of spindle motors for hard disk drives in place of roller bearings. Benefits of such hydrodynamic bearings, in comparison to rotary bearings which use roller bearings, include a low noise level, improved running precision and a significant increase in shock resistance. In addition, fewer parts are required for a hydrodynamic bearing assembly resulting in a considerable reduction in manufacturing costs.

In a hydrodynamic bearing, a preferably cylindrical shaft is rotatably supported within the bore of a bearing sleeve. The inner diameter of the bearing bore is slightly larger than the outer diameter of the shaft, so that a fine bearing gap is created between the opposing surfaces of the bore and the shaft. The bearing gap is filled with a lubricant, preferably bearing oil. In order to build up hydrodynamic pressure in the bearing gap, at least one of the opposing bearing surfaces is provided with a groove pattern. Due to the relative rotary movement between the opposing bearing surfaces, a pumping action is generated by the grooves within the lubricant that results in formation of a homogeneous lubricating film of regular thickness separating the bearing surfaces from each other. This homogenous lubricating film is stabilized by means of hydrodynamic pressure zones.

Since any contamination of data disks rotating within the clean-zone area of a hard disk drive inevitably results in sticking of the read/write head and total failure of the drive, it is necessary to protect the drive against leakage or splashing out of bearing oil from a hydrodynamic bearing. Such protection can only be provided by means of sealing methods which operate on a non-contact basis because contact-based sliding seats continuously generate foreign particles during rotation that can result in a head crash and can further lead to the total failure of the hard disk drive.

Protective or sealing effect of simple labyrinth seals or so-called "viscous seals" do not provide adequate protection in hydrodynamic bearing systems because they can not prevent oil from leaking and splashing out. Further, oil can penetrate through such seals into the disk area due to its propensity to seep.

U.S. Pat. No. 5,541,462 suggests the use of magnetic fluid seals in which, under the influence of a magnetic field, a continuous, annular film of ferrofluid is formed between the rotating and stationary bearing components. This involves a "liquid" seal confined in a magnetic field which can even withstand a certain difference in pressure. However, manufacturing the necessary ferrofluid is costly and the filling process is difficult and subject to errors. Thus, use of such ferromagnetic seals involves considerable extra cost. In addition, their use is limited to rotational speeds of up to 10 000 rpm since with higher rpms an additional flow loss increases greatly that reduces the overall efficiency of the motor to an unacceptable extent.

A much more reasonable solution in terms of costs, that does not cause additional loss even at high rpms, is based on the exploitation of the material-specific characteristics of the lubricant, in other words, it uses active principles behind capillary, adhesive and cohesive forces.

A solution in this respect was suggested, for example, in U.S. Pat. No. 5,667,309 in which the bearing bore features a tapered area at one end of the bearing sleeve in the shape of a conical counterbore, while the opposite end features an air-tight seal. The bag section shape of this hydrodynamic bearing increases lubricant's retention capability, particularly when subjected to shock, by means of which the sealing action of the seal, referred to as a "capillary seal", is improved. Through the counterbore in the bearing sleeve, a concentric tapered area widening outwards in the direction of the bearing sleeve end is formed between the sleeve's inner surface and the shaft's outer surface which is filled partially with bearing oil. Lubricating oil covers surfaces of the sleeve and the shaft forming a meniscus with a concave contact surface between the oil and the air. Bearing oil held in the tapered area functions as a lubricant reservoir from which vaporized oil can be replaced. The tapered area between the inner surface of the cone and the outer surface of the shaft above the meniscus functions as an equalizing volume into which the bearing oil can rise when its temperature-sensitive volume increases with a rise in temperature causing the fluid level to increase. A bearing arrangement with a similar capillary seal is disclosed in DE 696 15 098 T2. Here, alongside the tapered counterbore at the end of the bearing sleeve, additional ducts are provided within the bearing sleeve to hold the lubricant.

The cohesive forces which are active in the fluid of the lubricant, supported by capillary forces in the bearing gap, prevent liquid bearing oil from escaping from the bearing and leaking into the clean-zone area. The slimmer the design of the tapered transition area and the higher the viscosity of the lubricant, the more effective the sealing action of this arrangement. The main factor limiting the operating life of a spindle motor with a bearing arrangement having a tapered capillary seal is the decrease in the quantity of lubricant over time since, due to vapor pressure, a continual vaporizing process takes place. With the loss of lubricant, the risk of metal surfaces contacting each other when the motor starts up and stops is increased. This process may cause foreign particles to rub off, some of these particles being larger than the thickness of the bearing gap. This results in dry running and galling of the bearing surfaces leading to blockage of the spindle motor.

A further disadvantage of the capillary seal solution revealed in both '309 and '096 references is the limited lifespan of the bearing because only a part of the available volume of the tapered area can be used as a lubricant reservoir due to its two-fold function. Another disadvantage is that the effective useful length of the bearing is reduced due to the tapered area being aligned axially inwards. Since the axial length and angle of inclination of the tapered area are dependent on the total filling volume and the viscosity of the lubricant, the ratio of the length of the tapered area to the length of the bearing becomes increasingly less favorable the thinner the lubricant. However, the use of low viscosity bearing oil, particularly for portable applications such as laptops, is indispensable due to the low power loss this oil provides.

It is also disadvantageous that the positive effect of the capillary forces on the lubricant retention capability is reduced disproportionately as the cross-section increases in size. This means that if the fluid level increases due to a rise in operating temperature and the device is subjected to an axial shock at the same time, there is an increased risk that bearing oil leaks out and is thrown off due to the reduced retention capability.

An important criterion for the suitability of hard disk drives having spindle motors with hydrodynamic bearings for use in portable devices is that power loss is kept to a minimum. As mentioned earlier, this objective can be achieved by using a low viscosity lubricant. However, the overall length of a capillary seal, of the art described above, which has been adapted for lower viscosity applications would increase to such an extent that the remaining useful bearing length would no longer suffice to accommodate a hydrodynamic radial bearing with a sufficient stiffness.

Other hydrodynamic bearing systems are known from U.S. Pat. No. 5,555,435 A and European Patent Publication EP 0 844 408 A2 in which a bore is provided in the bearing sleeve to ventilate the bearing gap or a lubricant reservoir. This bore, however, does not function as a lubricant reservoir or an equalizing volume.

German Patent No. DE15 25 198 A discloses a hydrodynamic journal bearing having an overflow duct for the lubricant between the radial bearing section and the axial bearing section. The duct is completely filled with lubricant and is not suitable for use as a lubricant reservoir or an equalizing volume.

U.S. Pat. No. 3,503,658A describes a hydrodynamic journal bearing system with a bearing sleeve sealed at one end, having an overflow duct for the lubricant provided between a pressure chamber formed on the sealed end of the bearing sleeve and the radial bearing section. Again this duct does not function as a reservoir or an equalizing volume.

SUMMARY OF THE INVENTION

The object of the invention is thus to provide a hydrodynamic bearing system with a lubricant reservoir and a non-contact seal whose sealing function is based on the action of capillary forces in such a way that the sealing function's realization is not impaired by any measures taken to create a lubricant reservoir.

In accordance with a first embodiment of the invention, at least one duct formed as a tapered bore is provided in the bearing sleeve with the duct extending from an outer area of the bearing sleeve to the bearing gap between the bearing sleeve and the shaft and ending with its narrowest cross-section in the bearing gap, wherein the duct functions as a lubricant reservoir and an equalizing volume and is at least partially filled with lubricant.

In another embodiment, at least one annular groove is provided at the outer diameter of the bearing sleeve which is connected to the bearing gap by at least one fluid-conducting duct, wherein both the groove and the duct function as lubricant reservoirs and equalizing volumes and are at least partially filled with lubricant. Similarly to the bore in the first embodiment, the tangential or annular groove which holds the lubricant can have a tapered cross-section or take the form of a notch.

This proposed solution is based on the creation of a separate lubricant reservoir, practically independent of the actual capillary seal and formed outside the bearing gap by providing at least one fluid-conducting duct which is connected to the bearing gap. Therefore, both the function of the capillary seal and of the lubricant reservoir can be optimized without detriment to the overall length of the bearing. For this purpose, the lubricant reservoir can, to a large extent, be designed and dimensioned in almost any way desired without requiring design changes to be made to the bearing sections themselves.

This duct is realized in the form of a tapered bore in which the bore end having the narrowest cross-section leads into the bearing gap. Thus, a lubricant reservoir is created which, although partially filled with bearing oil, still provides a sufficient overflow volume for the lubricant as it expands under rising temperatures without impairing the lubricant retention capability of the hydrodynamic bearing.

Under a first embodiment of the invention, the bore extends from the outer diameter of the bearing sleeve through to its inner diameter and leads into the bearing gap. Here, the bore is preferably and essentially introduced perpendicular to the rotational axis of the bearing system.

In another embodiment of the invention, the bore extends at an angle a to the rotational axis starting from one end of the bearing sleeve through to its inner diameter which means that the bore forms an angle of 60°, for example, to the rotational axis of the bearing system and ends in the bearing gap.

To increase the lubricant capacity, a plurality of such bores can be distributed over the circumference of the bearing sleeve.

The volume and lubricant filling level of the bores or the groove are chosen in such a way that on one hand a sufficient overflow space for the increase in the volume of the lubricant due to its temperature-related expansion is provided, and, on the other hand, that the loss of lubricant due to vaporization can be compensated over the desired lifespan of the spindle motor. Thus, the filling level of the lubricant reservoir created by the groove and/or the bore can account, for example, for at least 50% of the total filling volume of the bearing arrangement.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
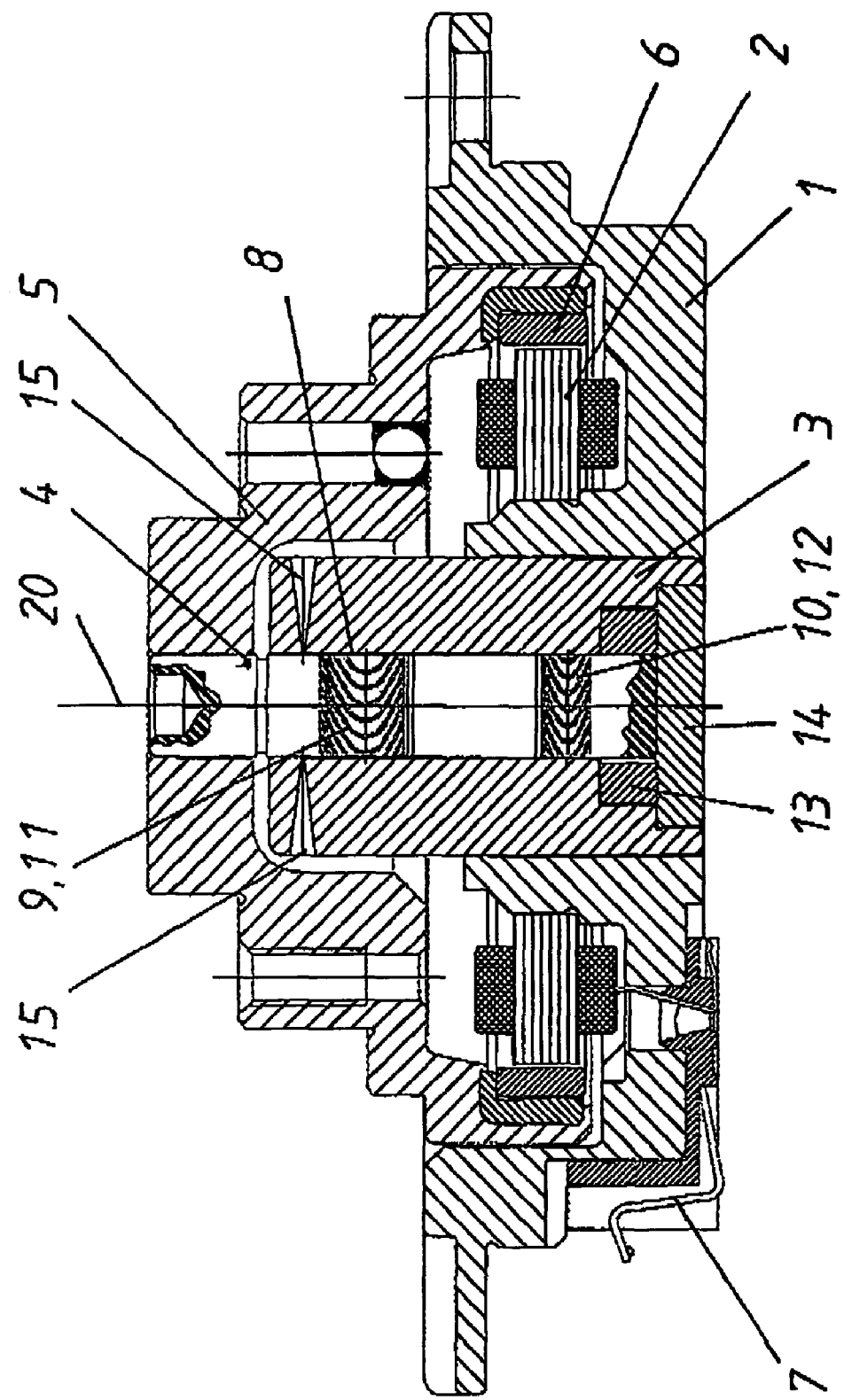
FIG. 1 shows a cross-sectional view of a spindle motor to power a hard disk drives incorporating a first embodiment of the lubricant reservoir according to the invention.
Figure 2:
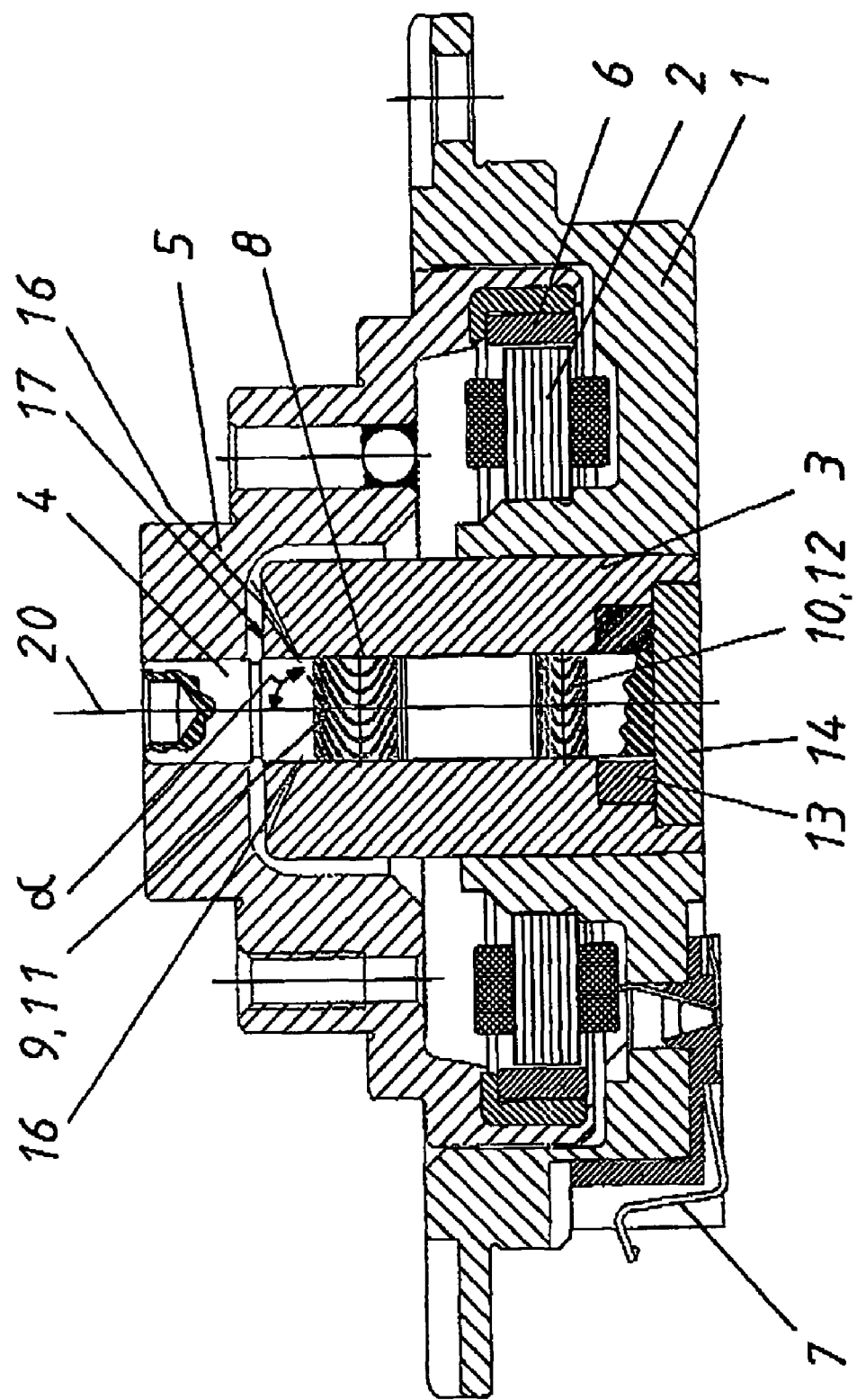
FIG. 2 shows a cross-sectional view of a spindle motor in accordance with FIG. 1 incorporating a second embodiment of the lubricant reservoir according to the invention.
Figure 3:
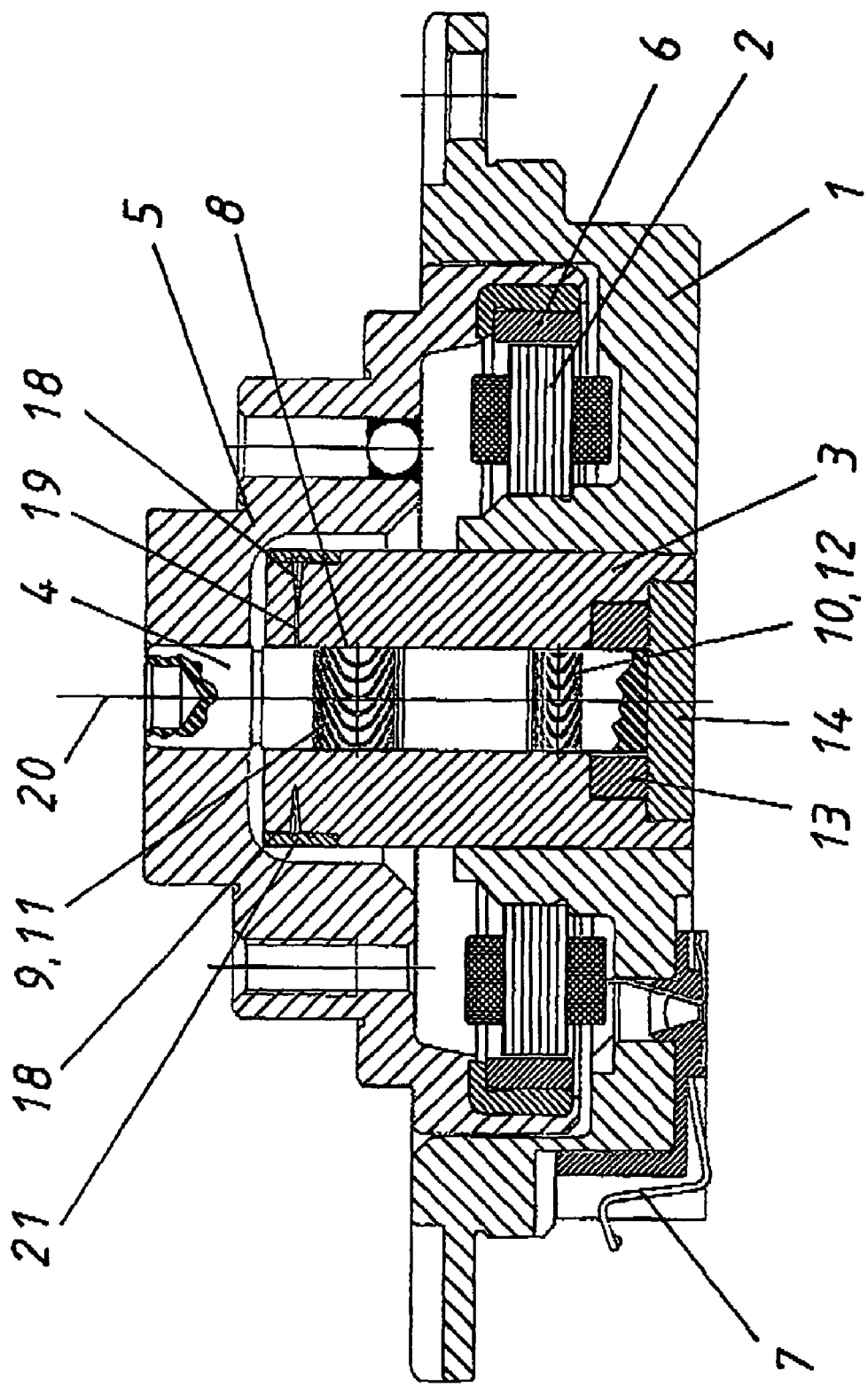
FIG. 3 shows a cross-sectional view of a spindle motor in accordance with FIG. 1 incorporating a third embodiment of the lubricant reservoir according to the invention.

As shown in FIGS. 1–3, a spindle motor to power a hard disk drive having a hydrodynamic bearing system is provided by the invention. In the examples illustrated, a shaft carrying the rotor is supported rotatably in a stationary bearing sleeve. As would be understood by a person skilled in the art, the invention also covers designs in which a stationary shaft is enclosed by a rotatable bearing sleeve supporting the rotor.

The spindle motor includes stationary base plate 1, on which stator arrangement 2, consisting of a stator stack and windings, is accommodated. Bearing sleeve 3 is firmly set in a recess in base plate I and features a cylindrical axial bore in which shaft 4 is rotatably accommodated. A free end of shaft 4 supports hub 5 on which one or more storage disks (not illustrated) of the hard disk drive can be arranged and mounted. Located at the inner, lower edge of hub 5 is annular permanent magnet 6 having a plurality of pole pairs which are affected by an alternating electrical field generated by stator arrangement 2 separated from them by an air gap so that rotor 5 is set in rotation together with shaft 4. Power is supplied to the stator windings by using, for example, electric contacts 7.

Bearing gap 8 is formed between the inner diameter of bearing sleeve 3 and the outer diameter of shaft 4. The bearing gap is filled with a lubricant. The hydrodynamic bearing arrangement is provided with two radial bearing sections 9, 10, which are marked by groove patterns 11, 12, formed on the outer surface of shaft 3 and/or on the inner surface of bearing sleeve 3. When rotor 5, and thus shaft 4, is set in rotation, hydrodynamic pressure is built up in the lubricant held within the bearing gap by virtue of groove patterns 11, 12, making the bearing capable of supporting the load.

A hydrodynamic thrust bearing is formed at the lower end of shaft 4 by thrust plate 13 fixedly mounted to the lower end of shaft 4 and cover plate 14. The hydrodynamic thrust bearing takes on the axial load of the bearing arrangement. Cover plate 14 seals the entire bearing arrangement from below so that no lubricant can escape from the bearing gap.

As shown in FIG. 1, in accordance with the first embodiment of the invention, a plurality of bores 15 is preferably provided in bearing sleeve 3. Bores 15 function as lubricant reservoirs and equalizing volumes for the lubricant contained in the bearing gap. Starting at the outer circumferential surface of bearing sleeve 3, bores 15 taper towards the inner diameter of the bearing sleeve until they reach bearing gap 8. The bearing gap is completely filled with lubricant, whereas bores 15 are only partially filled.

As shown in FIG. 2, in accordance with a further embodiment of the invention, a plurality of ducts 16 is preferably provided at the end of bearing sleeve 3. Ducts 16 function as lubricant reservoirs and equalizing volumes for the lubricant. Starting at end face 17 of bearing sleeve 3, ducts 16 extend at an angle a to rotational axis 20 tapering towards the inner diameter of the bearing sleeve until they reach bearing gap 8. Here again, bearing gap 8 is completely filled with lubricant, whereas ducts 16 are only partially filled.

A further embodiment of the invention is shown in FIG. 3 featuring annular groove 18 or notch provided on the outer circumference of bearing sleeve 3 that also acts as a lubricant reservoir and equalizing volume for the lubricant. The bottom of each groove 18 is connected to bearing gap 8 preferably via several fluid-conducting bores 19, so that the lubricant can be replenished in bearing gap 8 from grooves 18.

Sleeve-shaped cover 21 is preferably set at the outer circumferential surface of bearing sleeve 3 in the area of groove 18 which seals groove 18 from the outside. This precaution greatly reduces vaporization of the lubricant. To ensure that the lubricant in the bearing gap is replenished, cover 21 features at least one ventilation bore to ventilate groove 18.

A cover, similar to cover 21, for the ducts and bores in the embodiments in accordance with FIGS. 1 and 2 would also be appropriate. Bores 15 according to the embodiment illustrated in FIG. 1 can thus be sealed in the same way by cover 21.

Duct 16 in accordance with FIG. 2 can be sealed, for example, by means of a disk-shaped cover set at the end of bearing sleeve 3.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:
   a bearing sleeve having an inner opening;
   a shaft accommodated in said inner opening of said bearing sleeve;
   a bearing gap formed between said shaft and said sleeve, said bearing gap being filled with a lubricant;
   at least one radial bearing section located between said bearing sleeve and said shaft for rotatably supporting said shaft and said bearing sleeve with respect to each other;
   an axial bearing section; and
   at least one duct formed within said bearing sleeve,
   wherein said duct is formed as a tapered bore extending from an outer portion of said bearing sleeve to said bearing gap, wherein said duct has its narrowest cross-section in said bearing gap, and wherein said duct comprises a lubricant reservoir and an equalizing volume and is at least partially filled with said lubricant.

2. The hydrodynamic bearing system according to claim 1, wherein said duct extends from an outer diameter to an inner diameter of said bearing sleeve.

3. The hydrodynamic bearing system according to claim 1, wherein said duct extends substantially perpendicular to a rotational axis of the hydrodynamic bearing system.

4. The hydrodynamic bearing system according to claim 1, wherein said duct extends from an end face to an inner diameter of said bearing sleeve.

5. The hydrodynamic bearing system according to claim 1, wherein said duct extends at an angle to a rotational axis of said hydrodynamic bearing system.

6. The hydrodynamic bearing system according to claim 1, wherein filling level of said lubricant reservoir accounts for at least 50% of a total filling volume of said hydrodynamic bearing system.

7. The hydrodynamic bearing system according to claim 1, wherein said duct is sealed by a cover of a predetermined shape.

8. A hydrodynamic bearing system, comprising:
a bearing sleeve having an inner opening;
a shaft accommodated in said inner opening of said bearing sleeve;
a bearing gap formed between said shaft and said sleeve, said bearing gap being filled with a lubricant;
at least one radial bearing section located between said bearing sleeve and said shaft for rotatably supporting said shaft and said bearing sleeve with respect to each other;
an axial bearing section; and
at least one annular groove located on an outer diameter of said bearing sleeve, said outer diameter of the bearing sleeve being exposed to an outside environment and being lubricant-free,
wherein said annular groove is connected to said bearing gap via at least one fluid-conducting duct, and wherein said groove and said duct each comprises a lubricant reservoir and an equalizing volume and is at least partially filled with said lubricant.

9. The hydrodynamic bearing system according to claim 8, wherein said groove is a notch.

10. The hydrodynamic bearing system according to claim 8, wherein filling level of said lubricant reservoir accounts for at least 50% of a total filling volume of said hydrodynamic bearing system.

11. The hydrodynamic bearing system according to claim 8, wherein said groove is sealed by a cover of a predetermined shape.

* * * * *